United States Patent [19]
Mason et al.

[11] Patent Number: 5,134,969
[45] Date of Patent: Aug. 4, 1992

[54] CAGE CONFIGURATION FOR ARBOREAL REPTILES

[75] Inventors: Robert T. Mason, Bethesda; Robert F. Hoyt, Jr., Boyds; Lewis K. Pannell, North Potomac, all of Md.

[73] Assignee: The United States of America as represented by the Department of Health and Human Services, Washington, D.C.

[21] Appl. No.: 594,923

[22] Filed: Oct. 10, 1990

[51] Int. Cl.$^5$ ............ A01K 1/00; A01K 31/07
[52] U.S. Cl. ............................................. 119/17
[58] Field of Search ....................... 119/17, 19, 15

[56] References Cited

U.S. PATENT DOCUMENTS

| | | | |
|---|---|---|---|
| 1,555,177 | 9/1925 | Barker | 119/17 X |
| 3,225,738 | 12/1965 | Palencia | 119/17 |
| 3,815,549 | 6/1974 | Opmeer | 119/17 |
| 4,104,986 | 8/1978 | Dunigan | 119/17 |
| 4,480,587 | 11/1984 | Sedlacek | 119/15 |
| 4,526,133 | 7/1985 | LoMaglio | 119/17 |
| 4,763,607 | 8/1988 | Tominaga | 119/17 |

FOREIGN PATENT DOCUMENTS

| | | | |
|---|---|---|---|
| 0270969 | 2/1914 | Fed. Rep. of Germany | 119/17 |
| 1260853 | 2/1968 | Fed. Rep. of Germany | 119/17 |
| 3126930 | 2/1983 | Fed. Rep. of Germany | 119/17 |
| 2342652 | 9/1977 | France | 119/17 |
| 3757 | of 1901 | United Kingdom | 119/17 |

Primary Examiner—Gene Mancene
Assistant Examiner—Todd E. Manahan
Attorney, Agent, or Firm—Lowe, Price, LeBlanc & Becker

[57] ABSTRACT

A cage for arboreal animals includes two compartments, each having a hinged, latched, door. The two compartments are separated by a sliding panel to enable maintenance to be performed easily and safely, minimizing unwanted contact between hazardous animals, such as venomous snakes, for example, and the investigators or maintenance personnel. The structure is further ventilated to provide air flow from bottom to top, and could maintain a humidity level in accordance with needs of caged animals. The sides of the cage are transparent to permit simple monitoring of the reptiles as well as to meet the social needs of those animals which need visual contact with other animals in adjacent cages. This cage meets or exceeds all current Federal principles and regulations for animal housing units.

18 Claims, 2 Drawing Sheets

CAGE CONFIGURATION FOR ARBOREAL REPTILES

TECHNICAL FIELD

This invention relates to animal housing units, and more particularly to improved cages for promoting the maintenance of a high humidity environment therein, if required by arboreal animals including mammals, birds, reptiles and particularly snakes. This invention further includes structural features to: a) minimize disturbances to the housed animals during daily maintenance and cleaning of the cage and b) for improving the safety of an investigator by isolating the animal from the investigator during such maintenance.

BACKGROUND ART

Both mammalian and nonmammalian species are used in biomedical research today. For various reasons, however, in recent years there has been increasing use of nonmammalian species. In 1985 the National Academy of Sciences issued a report describing the increasing trend in the use of non-traditional models for biomedical research (as reported by the Committee on Models for Biomedical Research in *Models for Biomedical Research: A New Perspective*, National Academy Press, Washington, DC, 1985). More recently, an in-depth discussion on the use of new models was given by Woodhead et al. in *Nonmammalian Animal Models for Biomedical Research*, CRC Press, Boca Raton, 1989. The description of nonmammalian animal model alternatives used in biomedical research emphasizes the emerging utility of these species with their specialized attributes. The species include fish, amphibians, birds and reptiles.

Reptiles (and more specifically arboreal reptiles) have recently emerged as animal models of considerable interest and potential. Although reptiles have not been commonly reported in previous biomedical literature, this status is changing, as may be noted by recent publications such as Callard I., ed. Unconventional Animal Models in Endocrine Research, *Journal of Experimental Zoology* 1990; In press and Greenberg N., Burghardt G. B., Crews D., Font E., Jones R. E., and Vaughan G. Reptile Models for biomedical research. In Woodhead A. D., and Vivirito K., eds. *Nonmammalian Animal Models for Biomedical Research*, CRC Press, Boca Raton, Fla., 1989. Thus, as noted in Greenberg, et al., it is now recognized "that several unique qualities of reptiles may provide models useful for research on a diverse array of problems of biomedical interest including developmental, endocrinological, neurological, and cellular aspects of stress and affective disorders, feeding, and reproductive dysfunction." It is known that reptiles are generally inexpensive, easily cared for and robust subjects to have as pet animals and possess unique abilities such as the ability for skin wounds to heal quickly even under less than aseptic conditions. As pet animals, or in zoos, they may be housed in everything from cardboard boxes to terrariums. When used in the biomedical research effort, however, caging criteria changes. Accordingly, there is a growing need for appropriate cages for use in housing such reptiles.

There are two branches of the Federal Government which regulate animal care and use in biomedical research: The U.S. Department of Agriculture (USDA) and the Department of Health and Human Services (DHHS).

The Animal Welfare Act, regulated by USDA, Animal and Plant Health Inspection Service, Laboratory Animal Welfare Act (PL89-544), US Government Printing Office, Hyattsville, Md., 1985, regulates care for animals to be used in various procedures. However, because reptiles are cold-blooded (poikilotherms), and not warm-blooded animals (homeotherms) they are not subject to the caging regulations of the Animal Welfare Act. Nonetheless, because they are vertebrates, reptiles fall within the definition of "animal" listed in the HHS *Public Health Service Policy on the Humane Care and Use of Laboratory Animals*, Revised 1986. Reptiles are thus subject to the requirements of the applicable regulations therein. It is noted that the Public Health Service Animal Welfare Policy uses the *Guide for the Care and Use of Laboratory Animals*, Committee on Care and Use of Laboratory Animals, Institute of Laboratory Animal Resources, National Research Council, National Institutes of Health, Bethesda, MD. DHEW Publication No. 85-23, 1985, as its interpretation of animal care and use activities, including caging, animal social environment, and provides guidelines for appropriate macro and micro environments such as temperature, humidity, ventilation, illumination and the like.

The Guide was prepared for the more traditionally used laboratory animals in biomedical research such as dogs, cats, rodents, rabbits and non-human primates. Accordingly, the Guide does not specifically provide appropriate guidance for caging reptiles, and other nonmammalian vertebrates.

As reptiles are vertebrates, because they possess a backbone, appropriate caging for these species must be in accordance with the general principles identified in the Guide. Caging should be designed to meet research requirements, facilitate animal well-being and minimize experimental variables. The cage should, moreover, be appropriate in size for the species being housed and should be designed with the safety of both the animal and the handler taken into consideration.

Specifically, the Guide calls for caging to provide space that 1) is adequate and comfortable; 2) provides an escape-proof enclosure that confines animals safely; 3) provides easy access to food and adequate ventilation; 4) meets the biological needs of the animals including maintenance of body temperature, urination, defecation, and reproduction; 5) keeps the animals dry and clean; 6) avoids unnecessary physical restraint, and 7) protects the animals from hazards.

From a practical and versatile point of view, the cage should be mobile and be constructed of sturdy, durable materials and should be designed to minimize cross-infection between adjoining units. Moreover, the cost and ease of construction should be balanced with durability of the final product.

There is accordingly a need in the prior art to provide a cage meeting the above requirements and having particular applicability to reptiles, specifically to arboreal reptiles and potentially other small mammals, birds, and the like.

Other criteria of concern in providing a cage for appropriate housing of arboreal reptiles include a requirement for satisfying both the needs of the animal and those of the investigator, which often are opposite to one another. For example, from the point of view of the animal, the cage should provide a suitable temperature and humidity, must be hygienic, and must contain the right furnishings such as hide boxes, water bowls, branches for climbing and the like.

However, from the investigator's point of view, the cage should be secure, to prevent escapes, should be easy to clean (with minimal upset to the inhabitants thereof) and should provide some safety for the investigator when the cage is used to house potentially hazardous species such as those that are venomous or overly aggressive.

Each of these criteria create definite needs for specific cage structures to provide appropriate housing for such animals.

Many prior art attempts at providing various cages are known but have various difficulties associated therewith. Thus, it has been known to use glass aquaria, plastic kitchen tubs and cages constructed of wood and wire screen to house such animals. However, numerous problems are associated with such prior art designs, including the presence of broken glass or sharp edges, which may be harmful both to the animals and to the investigators. Further, decaying or warping wood construction and rusted metal fixtures can provide yet a further source of difficulty. Finally, most of these prior art designs are difficult to sanitize. To be in compliance with applicable Federal laws and regulations, this ability to sanitize is mandatory.

Various other cages are described in the patent literature as follows.

U.S. Pat. No. 3,815,549 to Opmeer discloses a bird cage having a pair of separable sections joined by an intermediate section, the sections being separable to improve maintenance. However, such a three-section cage is more difficult to construct and includes an open section at the top, thus failing to meet objectives for an all purpose housing apparatus.

U.S. Pat. No. 4,763,607 discloses a pet animal cage which includes clear plastic sides and a removable lid secured to the plastic sides by hook means. Suction cups are used to maintain the lid on the base. The cage is indicated as being useful for animals including snakes and lizards.

U.S. Pat. No. 4,526,133 to LoMaglio discloses an animal isolation cage ward which has a perforated metal top. The disclosed device provides upper and lower confinement units and separate doors, of transparent material, for each confinement unit. However, the device is intended primarily for use with small laboratory animals having infectious diseases and is intended for isolating the animals from one another. Accordingly, there is no provision for airflow from one unit to the other. Indeed, the two portions of the cage are two separate units rather than two portions of a single confinement unit separated by a slidable partition.

U.S. Pat. No. 4,480,587 discloses an animal cage utilizing a perforated metal top.

U.S. Pat. No. 3,225,738 discloses an animal cage and support which is provided with a removable floor divider as shown in FIG. 6.

Thus, none of the prior art teaches or suggests an acceptable cage for arboreal animals which meets or exceeds the various requirements for cages for arboreal animals, whether requirements established by regulation or by safety considerations, and the like.

DISCLOSURE OF THE INVENTION

It is accordingly an object of the present invention to overcome the difficulties of the prior art and to provide an easily manufactured cage preferably for arboreal animals.

It is a more specific object of the invention to provide a cage for arboreal animals which facilitates the maintenance of appropriate individual species temperature and humidity conditions, while also providing for ease in maintenance and for safety of investigators.

It is a more particular object of the invention to provide a cage having transparent sides to enable observers to monitor the animals visually, without requiring frequent handling of the animals, and further to provide a comfortable environment for animals which may need to see each other.

It is another object of the invention to provide a cage for arboreal animals including a structural configuration to enable proper ventilation, and more specifically to provide ventilated door structures at a bottom section and a perforated upper section at the top to provide air flow from the bottom to the top of the cage.

Still another object of the invention is to provide a cage structure having a sliding panel for separating the cage into two compartments, thus to simplify maintenance of the cage while minimizing danger to maintenance and investigative personnel from the caged animal. Still an additional object of the invention is to provide a portable cage structure, including handles for transportability by one or two persons, wherein the walls and other structural components are made of a transparent plastic material which provides for the maintenance of a proper, humid environment for the caged animal (if required), to provide a proper social environment enabling the animals to see other animals of the species in adjacent cages, and including a safety structure in the form of a sliding door separating the cage into two compartments thus permitting maintenance and investigative access to one compartment while the caged animal is secured in the other compartment, without danger to the maintenance or investigative personnel.

In accordance with the foregoing and other objects of the invention, there is accordingly provided a cage assembly for retaining an animal including first and second compartments. The compartments have walls of substantially identical material and respective first and second doors. The compartments substantially adjoin each other and are in open communication with each other. A panel separates the first and second compartments and selectively isolates the compartments from one another, thereby simplifying maintenance of the cage assembly by permitting isolation of a caged animal in one of the compartments while permitting maintenance tasks to be performed in the other of the compartments, thus eliminating the possibility of harmful contact between the animal and the maintenance person.

Preferably, the compartments each include transparent walls for permitting an observer to monitor the animal caged therein.

In accordance with one aspect of the invention, the compartments are vertically displaced from one another. In this embodiment, the door provided for the lower one of the two compartments includes ventilating openings. Moreover, the cage assembly includes a roof panel on an upper portion of the upper compartment, the roof panel including second ventilating openings therein. This arrangement advantageously enables ventilating air to flow from bottom to top of the cage.

In accordance with another aspect of the invention, the first and second compartments are adjoiningly located and are horizontally displaced from one another. In this embodiment, at least one of the first and second doors includes the ventilating openings in a lower portion thereof, and the roof panel includes the second ventilating openings therein, over at least one of the first and second compartments, thus maintaining the advantage of enabling ventilating air flow from bottom to top of the cage assembly.

Other than at the ventilation openings, the doors are preferably substantially solid and transparent. Each door may be formed of a panel, hingedly connected at one edge thereof to the respective compartment. The assembly may further include a latching structure at an opposite edge of the doors for latchingly opening and closing the respective compartments. The doors may occupy an entire vertical wall panel of the compartments.

Preferably, the separating panel is also transparent, thus enabling an observer to observe both the first and second compartments. A sliding arrangement is used to engage the panel to the compartmentalized structure of the cage assembly, thus enabling the panel to slidingly enter a position between the first and second compartments to separate the compartments from one another. In the first embodiment, the panel is horizontally disposed between the two vertically displaced compartments while, in the second embodiment, the panel is vertically disposed between the horizontally displaced compartments.

Handles may be provided on an exterior surface to provide portability to the cage assembly.

Other objects, features and advantages of the present invention will become readily apparent to those skilled in the art from the following description wherein there is shown and described a preferred embodiment of the invention, simply by way of illustration and not of limitation of the best mode (and alternative embodiments) for carrying out the invention. The invention itself is set forth in the claims appended hereto. As will be realized upon examination of the specification with due reference to the drawings, the present invention is capable of still other, different, embodiments and its several details are capable of modifications in various obvious aspects, all without departing from the invention which is recited in the claims. Accordingly, the drawings and the descriptions provided herein are to be regarded as illustrative in nature and not as restrictive of the invention.

BRIEF DESCRIPTION OF DRAWINGS

The accompanying drawings, incorporated into and forming a part of the specification, illustrate several aspects of the present invention and, together with the description, serve to explain the principles of the invention. In the drawings.

BEST MODE FOR CARRYING OUT THE INVENTION

Figure 1:
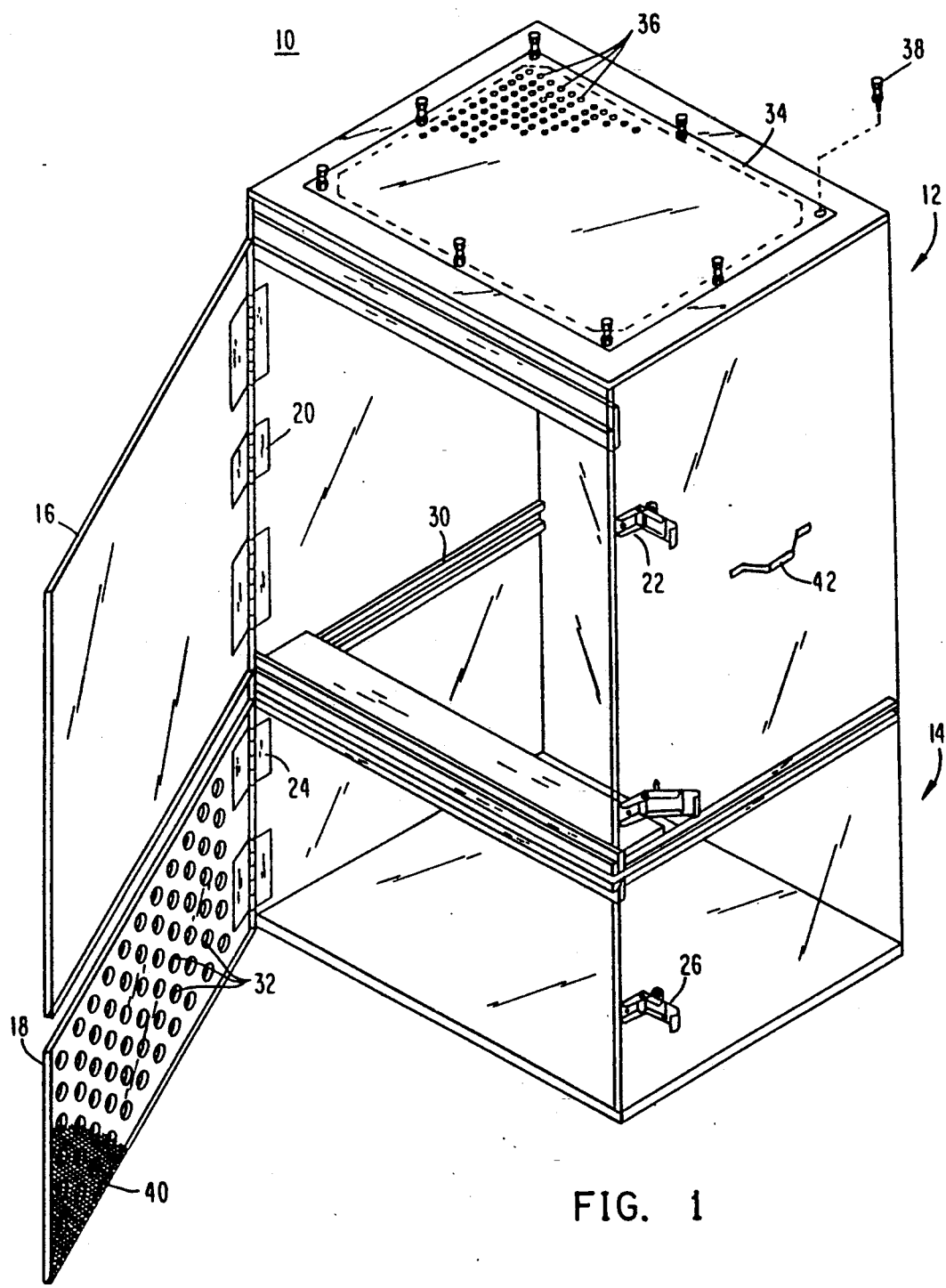
FIG. 1 shows a preferred embodiment of the invention in perspective view.
Figure 2:
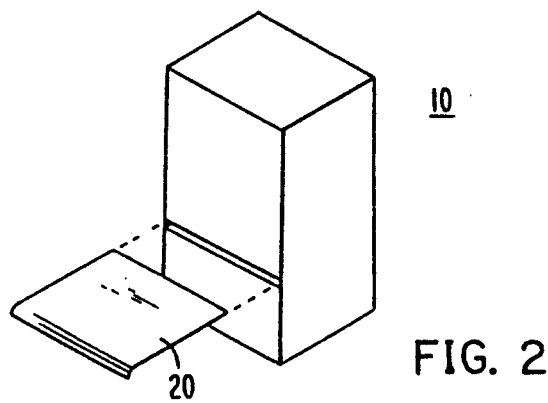
FIG. 2 shows a detail of the embodiment of FIG. 1, highlighting a sliding panel used therein.

Referring now to FIGS. 1 and 2, there is shown a preferred embodiment of the invention wherein a cage assembly is generally identified by reference numeral 10. The inventive assembly includes a first compartment 12, mounted vertically above a second compartment 14.

As is seen from the drawing, each compartment includes a separate door. Compartment 12 is closed by a door 16 and compartment 14 is closed by a door 18. The doors are shown as sufficiently wide to permit passage therethrough of any object or reptile which may fit within the compartments. Particularly, each door is seen to comprise an entire wall section of the respective compartment. Of course, the doors may be smaller than the size of an entire respective wall sections without departing from the scope of the invention.

Doors 16 and 18 are each hinged at one end thereof and latched at another end. Thus, door 16 is hinged on hinges 20 and is latched by latch 22, while door 18 is hinged on hinges 24 and latched by latch 26.

A sliding panel 28, shown withdrawn in FIG. 2, separates the two compartments 12 and 14 one from the other. Panel 28 slides on a track structure 30 provided on the interior surface of the cage assembly. The track structure may be in one or the other of the two compartments, or may be located between the upper and lower compartments 12 and 14.

Although both doors are shown as being latched on sides opposite to the sides at which the respective hinges thereof are located, it should be clear that the latches may be provided on sides of the doors which are adjacent the hinged sides thereof. Indeed, for securing the sliding panel 28 in place, it is possible that the latching structure may be provided in the area between the two doors, so that one or more of the doors may be latched to the sliding panel 28, to an adjacent portion of the track structure fixed to the cage assembly, or to the cage assembly itself, thus locking the sliding panel and preventing withdrawal thereof. Further, it should be clear that the doors 16 and 18 are not necessarily hinged and/or latched at the same sides thereof.

There is provided a ventilation structure to permit air to flow through the cage from bottom to top in structure 10. Particularly, in the lower one of the two doors, door 18, there are provided a plurality of ventilation holes 32. Similarly, in an upper roof panel 34 there are provided cooperating ventilation holes 36. Thus, by providing a heating source, or the like, externally to the cage and adjacent ventilation holes 32, or internally to the cage, air flow may be directed in the appropriate direction. Similarly, by providing substantially solid surfaces for the cage structure, the humidity level therein may be increased appropriately.

In the presently preferred embodiment of the invention, the cage illustratively has dimensions of 35" in height, 16" in depth and 20" in width. The doors, bottom and sidewall portions of the cage structure are formed of Plexiglas sheets, having a thickness of $\frac{3}{8}$ inch and bonded together by a commercially available adhesive for Plexiglas known as GC-25, which leaves no residue. Of course, other solid, transparent, panels may be used, whether of plastic, glass, or other materials. For example, Lexan ® panels enable the cage to be steam autoclaved, as needed for sanitation purposes.

The top of the cage is formed of a sheet of 1/16 inch perforated stainless steel, type 304, fastened to the upper Plexiglas roof panel 34 by eight #10 thumb screws 38. The ventilation holes 32 in the bottom door 18 are arranged at 1.5 inch spacing center to center, for holes having $\frac{1}{2}$ inch diameters. A fine nylon mesh screen 40 is affixed to the inside surface of the bottom door.

The sliding panel 28 is formed of aluminum, and track structure 30 is formed of a set of ¼ inch by ¼ inch Plexiglas strips to serve as a track for the aluminum panel which separates the top half of the cage, compartment 12, from the bottom half thereof, compartment 14.

To enhance portability of the cage structure, there are provided two aluminum lifting handles on each side (one such handle 42 being shown in FIG. 1), so that the cage may be moved by one or two persons.

Figure 3:
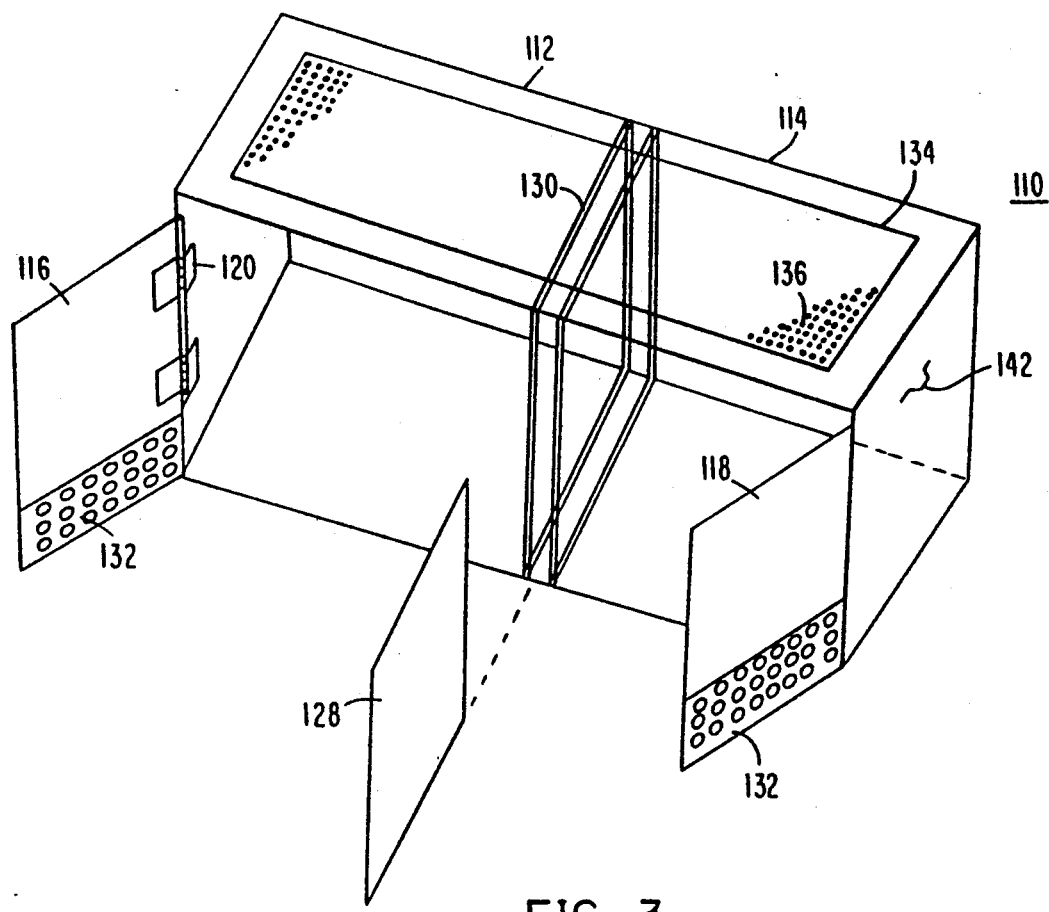
FIG. 3 shows an alternative embodiment of the invention, wherein the compartments are displaced horizontally relative to each other.

Referring now to FIG. 3, there is shown an alternate embodiment of the invention. As illustrated therein, the cage assembly may alternatively have horizontally displaced compartments. Thus, as shown in the Figure, the cage assembly, generally identified by reference numeral 110, includes a first compartment 112, mounted horizontally to the left of a second compartment 114.

As is seen from the drawing, each compartment includes a separate door. Compartment 112 is closed by a door 116 and compartment 114 is closed by a door 118. Although not drawn to include all the details of FIG. 1, since the same structural features are generally to be included in both embodiments, the doors of the alternate embodiment of FIG. 3 may be sufficiently wide to permit passage therethrough of any object or reptile which may fit within the compartments. As with the embodiment of FIG. 1, each door may comprise an entire wall section of the respective compartment.

Doors 116 and 118 are each hinged at one end thereof and latched at another end. Thus, door 116 is hinged on hinges 120. Neither the latches for door 116, nor the latches or hinges for door 118, are shown in the figure although location of the same will be apparent upon comparison of FIGS. 1 and 3.

A vertically mounted sliding panel 128 separates the two compartments 112 and 114 one from the other. Similarly to the embodiment of FIG. 1, panel 128 slides on a track structure 130 provided on the interior surface of the cage assembly.

It is noted that, for locking the sliding panel 128 and preventing withdrawal thereof, the latching structure for doors 116 and 118 (not shown) may be provided between the two doors, so that one or more of the doors may be latched to the sliding panel or to an adjacent portion of the track structure fixed to the cage assembly, as well as to the cage assembly itself. Further, as illustrated in FIG. 3, the doors 116 and 118 are hinged and latched at opposite sides thereof.

To maintain for a high humidity environment for the reptile caged in the structure 110, the ventilation structure provided therein permits air to flow through the cage from bottom to top. The high humidity is maintained through the daily spraying of the animals and the inside walls of the cage with a plant mister through the holes in the cage. Thus, in the lower portion of each of the two doors there are provided a plurality of ventilation holes 132. Of course, the ventilation openings may be provided in only one of the doors.

Similarly, in an upper roof panel 134 there are provided cooperating ventilation holes 136.

The doors, bottom and sidewall portions of the cage structure are preferably formed of Plexiglas sheets, having a predetermined thickness (such as ⅜ inch similarly to the embodiment of FIG. 1). Other transparent materials may be used. The sliding panel 128 is formed of aluminum, and track structure 130 is preferably formed of a set of Plexiglas strips to serve as a track for the aluminum panel which separates the two compartments 112 and 114.

The top of the cage is formed of a sheet of perforated stainless steel, fastened to the upper Plexiglas roof panel 134 by a number of fasteners (not shown). A fine nylon mesh screen (not shown) may be affixed to the inside surface of the doors at the ventilation openings 132. Aluminum lifting handles 142 are provided on each side.

There have thus been described two embodiments of the invention, which provide a cage design for arboreal reptiles addressing various regulatory and safety criteria and which may be used for housing venomous or aggressive species. Upon experimentation with the embodiment of FIGS. 1 and 2, it has been found that the various research requirements therefor are all met. The structure further meets all current federal caging principles and requirements for the appropriate animal housing of laboratory animals.

The cage may be either sterilized either by autoclaving (if constructed of Lexan ®), or by placing in an ethylene oxide sterilizer. The cage may be sanitized with hot water and antiseptic soap. Adequacy of ventilation provided by the cage structure is demonstrated by the lack of any persistent remanent odors in the cage.

In use, it has been found that daily spraying of the inside surfaces of the cage walls is sufficient to maintain the high humidity required by the subjects. The clear sides used in the cage structure have made visualization of animal behavior straightforward. The transparent panels further contribute to the continuing efforts to monitor the animals' health status visually, without engendering any additional stress by frequent handling.

Moreover, the animal behavior may be videotaped by a camera situated remotely from the cage, further minimizing disturbance to the animals.

In studying the chemical ecology of the Guam brown tree snake, *Boiga irregularis*, an arboreal species which is both aggressive and rear-fanged, it has been desirable to limit snake contact with the animal handlers. By sliding the metal panel into the slots, the snake has been isolated in the top compartment 12 of the cage of FIG. 1, thus enabling the animal handler to have safe access to the bottom compartment 14 in order to change the bedding, water, etc. This significantly reduces the stress to both the animals, animal caretakers and investigators.

The cage may be modified for use with many other species. Because of its transparency, the cage is ideal for animals that need to see each other. For those that do not, a simple barrier may be placed between cages. Although live plant material is not currently used in the research effort, the inventive cages are expected to accommodate live plants well. Thus, the inventive cages are ideal for housing of many animal species including lizards, small arboreal mammals, birds, and small arboreal non-human primates such as tamarinds or owl monkeys.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

We claim:

1. A reptile-cage assembly for retaining a reptile, comprising:

first and second compartment sections defined by wall portions of substantially identical material, said first and second compartment sections located substantially adjoining each other and in open communication with each other;

humidifying means for increasing humidity level within the cage assembly and for preventing escape of the reptile therethrough, said humidifying means comprising substantially solid transparent material forming said wall portions defining said first and second compartment sections, together with openings in the cage assembly, to increase humidity within the cage assembly;

panel means separating said first and second compartment sections for selectively isolating said compartment sections from one another thereby simplifying maintenance of the cage assembly by permitting isolation of a caged reptile in one of said first and second compartment sections while performing maintenance tasks in the other of said compartment sections without a possibility of contact between the reptile and a person performing said maintenance tasks, and first and second doors respectively provided for said first and second compartment sections.

2. A reptile-cage assembly as recited in claim 1 wherein said compartment sections are adjoiningly positioned vertically displaced from one another and wherein said first door is provided for the lower positioned compartment section, said first door including a first set of said openings therein, further comprising a roof panel on an upper portion of the upper positioned compartment section, said roof panel including a second set of said openings therein, thereby enabling ventilating air flow from bottom to top of said cage assembly.

3. A reptile-cage assembly as recited in claim 1 further comprising sliding means engaging said panel means for enabling said panel means to slidingly enter a position between said first and second compartment sections to separate said compartment sections from one another.

4. A reptile-cage assembly as recited in claim 3 wherein said panel means is substantially transparent for enabling an observer to observe both said first and second compartment sections.

5. A reptile-cage assembly as recited in claim 4 further comprising handle means on an exterior surface of at least one of said first and second compartment sections to provide portability to said reptile-cage assembly.

6. A cage assembly for retaining a snake, comprising:
first and second compartment sections structured of wall portions of substantially solid transparent material, said first and second compartment sections located substantially adjoining each other horizontally displaced from one another and in open communication with each other;

ventilating openings in the cage assembly for introducing moisture thereto and for cooperating with said substantially solid transparent material to increase humidity within the cage assembly;

panel means separating said first and second compartment sections for selectively isolating said compartment sections from one another thereby simplifying maintenance of the cage assembly by permitting isolation of a caged snake in one of said first and second compartment sections while performing maintenance tasks in the other of said compartment sections without a possibility of contact between the snake and a person performing said maintenance tasks, and first and second doors respectively provided for said first and second compartment sections.

7. A cage assembly as recited in claim 6 wherein at least one of said first and second doors includes a first set of said ventilating openings in a lower portion thereof, further comprising a roof panel on an upper portion of the cage assembly, said roof panel including a second set of said ventilating openings therein over at least one of said first and second compartment sections, thereby enabling ventilating air flow from bottom to top of said cage assembly.

8. A cage assembly as recited in claim 7 wherein said first and second doors are substantially solid and transparent at portions other than said ventilating openings, wherein said solid transparent walls enable an observer to monitor the snake caged therein.

9. A cage assembly as recited in claim 8 wherein said first and second doors comprise a panel hingedly connected at one edge thereof to said respective first and second compartment sections, and further including latching means at an opposite edge of said first and second doors for latchingly opening and closing said respective first and second compartment sections.

10. A cage assembly as recited in claim 9 wherein said first and second doors comprise substantially an entire vertical wall panel of said first and second compartment sections.

11. A cage assembly as recited in claim 10 wherein said panel means is substantially transparent for enabling an observer to observe both said first and second compartment sections, and further comprising sliding means engaging said panel means for enabling said panel means to slidingly enter a position between said first and second compartment sections to separate said compartment sections from one another.

12. A cage assembly as recited in claim 6 further comprising sliding means engaging said panel means for enabling said panel means to slidingly enter a position between said first and second compartment sections to separate said compartment sections from one another.

13. A cage assembly as recited in claim 12 wherein said panel means is substantially transparent for enabling an observer to observe both said first and second compartment sections.

14. A cage assembly as recited in claim 13 further comprising handle means on an exterior surface of at least one of said first and second compartment sections to provide portability to said cage assembly.

15. A cage assembly for retaining an animal, comprising:
first and second compartment sections structured of wall portions of substantially identical material, said first and second compartment sections located substantially adjoining each other and in open communication with each other;

panel means separating said first and second compartment sections for selectively isolating said compartment sections from one another thereby simplifying maintenance of the cage assembly by permitting isolation of a caged animal in one of said first and second compartment sections while performing maintenance tasks in the other of said compartment sections without a possibility of contact between the animal and a person performing said maintenance tasks, and first and second doors respectively provided for said first and second compartment sections, wherein said compartment sections are adjoiningly positioned vertically displaced from one another and wherein said first door is provided for the lower positioned compartment section, said first door including first ventilating openings therein, further comprising a roof panel on an upper portion of the upper positioned compartment section, said roof panel including second ventilating openings therein, thereby enabling ventilating air flow from bottom to top of said cage assembly in order to maintain high humidity for a reptile caged therein, and wherein said second door is provided for the upper positioned compartment section, said second door being substantially solid and transparent, each said compartment section including solid transparent walls for enabling an observer to monitor the animal caged therein.

16. A cage assembly as recited in claim 16 wherein said first and second doors comprise a panel hingedly connected at one edge thereof to said respective first and second compartment sections, and further including latching means at an opposite edge of said first and second doors for latchingly opening and closing said respective first and second compartment sections.

17. A cage assembly as recited in claim 16 wherein said first and second doors comprise substantially an entire vertical wall panel of said first and second compartment sections.

18. A cage assembly as recited in claim 17 wherein said panel means is substantially transparent for enabling an observer to observe both said first and second compartment sections, and further comprising sliding means engaging said panel means for enabling said panel means to slidingly enter a position between said first and second compartment sections to separate said compartment sections from one another.

* * * * *